US008679582B2

(12) United States Patent
Cumberland et al.

(10) Patent No.: US 8,679,582 B2
(45) Date of Patent: Mar. 25, 2014

(54) TUNABLE VARIABLE EMISSIVITY MATERIALS AND METHODS FOR CONTROLLING THE TEMPERATURE OF SPACECRAFT USING TUNABLE VARIABLE EMISSIVITY MATERIALS

(75) Inventors: Robert Cumberland, Malibu, CA (US); William B. Barvose-Carter, Ventura, CA (US); Adam F. Gross, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 1110 days.

(21) Appl. No.: 12/705,782

(22) Filed: Feb. 15, 2010

(65) Prior Publication Data
US 2011/0039035 A1   Feb. 17, 2011

Related U.S. Application Data

(62) Division of application No. 11/468,033, filed on Aug. 29, 2006, now Pat. No. 7,691,284.

(51) Int. Cl.
B05D 3/02   (2006.01)

(52) U.S. Cl.
USPC .......................................... 427/226

(58) Field of Classification Search
USPC ................................. 427/226, 224
See application file for complete search history.

(56) References Cited

U.S. PATENT DOCUMENTS

| 3,872,911 | A | 3/1975 | Janes |
| 4,432,609 | A | 2/1984 | Dueker et al. |
| 4,669,685 | A | 6/1987 | Dalby |
| 5,143,801 | A | 9/1992 | Bates |
| 5,266,419 | A | 11/1993 | Yamada |
| 5,487,356 | A * | 1/1996 | Li et al. ............................ 117/99 |
| 6,176,453 | B1 * | 1/2001 | Long et al. .................. 244/171.7 |
| 6,511,021 | B1 | 1/2003 | Keramidas |
| 6,534,211 | B1 | 3/2003 | Tsukuda et al. |
| 6,538,796 | B1 | 3/2003 | Swanson |

(Continued)

FOREIGN PATENT DOCUMENTS

| DE | 4104838 | 8/1992 |
| EP | 467590 | 1/1992 |
| JP | 11-238615 | 8/1999 |
| WO | 03/092089 | 11/2003 |

OTHER PUBLICATIONS

Urushibara et al., "Insulator-metal transition and giant magnetoresistance in La1-xSrxMnO3", Phy. Rev. B, vol. 51, #20, May 1995, pp. 103-109.

(Continued)

Primary Examiner — Robert Vetere
(74) Attorney, Agent, or Firm — Hanley, Flight & Zimmerman, LLC

(57) ABSTRACT

Tunable variable emissivity materials, methods for fabricating tunable variable emissivity materials, and methods for controlling the temperature of a spacecraft using tunable variable emissivity materials have been provided. In an exemplary embodiment, a variable emissivity material has the formula $M1_{(1-(x+y))}M2_xM3_yMnO_3$, wherein M1 comprises lanthanum, praseodymium, scandium, yttrium, neodymium or samarium, M2 comprises an alkali earth metal, M3 comprises an alkali earth metal that is not M2, and x, y, and (x+y) are less than 1. The material has a critical temperature ($T_c$) in the range of about 270 to about 320K and a transition width is less than about 30K.

11 Claims, 5 Drawing Sheets

(56) References Cited

U.S. PATENT DOCUMENTS

| | | |
|---|---|---|
| 7,105,138 B2 | 9/2006 | Hur et al. |
| 7,691,284 B2 * | 4/2010 | Cumberland et al. . 252/62.51 R |
| 2001/0027856 A1 * | 10/2001 | Okamoto et al. ............... 165/96 |
| 2002/0003229 A1 | 1/2002 | Mase et al. |
| 2004/0155154 A1 | 8/2004 | Topping |
| 2006/0057455 A1 | 3/2006 | Guntow et al. |

OTHER PUBLICATIONS

Tachikawa et al., "Development of a Variable Emittance Radiator Based on a Perovskite Manganese Oxide", Jour. Thermophysics, vol. 17, #2, Apr.-Jun. 2003, pp. 264-268.

Woods et al., Observation of Charge Ordering and the Ferromagnetic Phase Transition in Single Crystal LSMO Using RF Transverse Susceptibility, J. Appl. Physics, vol. 97 (10C104), 2005, 3 pages.

Shimazaki et al., Computational Design of Solar Reflection and Far-Infrared Transmission Films for A Variable Emittance Device, Applied Optics, vol. 42 (7), Mar. 1, 2003, pp. 1360-1366.

Shimazaki et al., Development of Spectral Selective Multilayer Film for a Variable Emittance Device and ITs Radiation Properties Measurements, Int'l J. of Thermophysics, vol. 24 (3), 2003, pp. 757-769.

Shimizu et al., Sol-gel Synthesis of Perovskite-Type Lanthanum Manganite Thin Films and Fine Powders Using Metal Acetylacetonate and Poly(vinyl alcholo), J. Am. Ceram. Soc., vol. 80(10), 1997, pp. 2702-2704.

McCormack et al., "Very Large Magnetoresistance in Perovskite-Like La-Ca-Mn-O Thin Films", Appl. Phys. Lett., vol. 64(22) May 30, 1994, pp. 3045-3047.

* cited by examiner

TUNABLE VARIABLE EMISSIVITY MATERIALS AND METHODS FOR CONTROLLING THE TEMPERATURE OF SPACECRAFT USING TUNABLE VARIABLE EMISSIVITY MATERIALS

This is a Divisional of application Ser. No. 11/468,033, filed on Aug. 29, 2006 now U.S. Pat. No. 7,691,284.

FIELD OF THE INVENTION

The present invention generally relates to methods for reducing temperature extremes experienced by aerospace systems, and more particularly relates to tunable variable emissivity materials and methods for controlling the temperature of spacecraft using tunable variable emissivity materials.

BACKGROUND OF THE INVENTION

Spacecraft, such as satellites, high-altitude inflatables, and military aircraft, are exposed to a wide range of thermal conditions during service. A side facing the sun is heated by direct solar radiation, while a side facing the void of space is cooled by radiation. Thermal control of the spacecraft is therefore important. Various techniques have been developed in an attempt to maintain the interior of the spacecraft at a temperature suitable for occupancy by human beings and sensitive equipment. However, prior art techniques have displayed a number of drawbacks.

One technique for moderating the temperature of a spacecraft utilizes thermal louvers, which consist of a series of mechanically controlled metal slats that can open and close, effectively increasing and decreasing radiative heat loss, in response to the temperature of the satellite. However, thermal louvers can add excessive weight to the spacecraft, require power to operate, and can be prone to failure.

In another technique, the external surface of the spacecraft is covered with a white coating. The coating is designed to absorb very little solar radiation, yet radiate thermal energy in the infrared spectrum, thus biasing the overall temperature of the satellite structure on which it is disposed towards cooler temperatures. However, while this solution can help limit the upper temperature of the satellite under variable orbital lighting conditions, certain coatings can leave the spacecraft susceptible to large temperature fluctuations. Critical onboard components, such as batteries, can be unduly stressed by excessive cooling unless they are heated by onboard power sources.

Accordingly, it is desirable to provide a variable emissivity material that can passively reduce the temperature extremes experienced by aerospace systems. It is also desirable to provide a variable emissivity material that is lightweight and requires no additional power source to control the temperature of a spacecraft. In addition, it is desirable to provide a method for fabricating a variable emissivity material. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

In accordance with an exemplary embodiment of the present invention, a variable emissivity material has the formula $M1_{(1-(x+y))}M2_xM3_yMnO_3$, wherein M1 comprises lanthanum, praseodymium, scandium, yttrium, neodymium or samarium, M2 comprises an alkali earth metal, M3 comprises an alkali earth metal that is not M2, and x, y, and (x+y) are less than 1. The material has a critical temperature ($T_c$) in the range of about 270 to about 320K and a transition width less than about 30K.

In accordance with another exemplary embodiment of the present invention, a method for fabricating a variable emissivity material comprises selecting a first alkaline earth metal M2 and selecting a second alkaline earth metal M3, wherein M3 is not M2. The method further comprises the step of forming $M1_{(1-(x+y))}M2_xM3_yMnO_3$, wherein M1 is selected from the group consisting of lanthanum, scandium, yttrium, praseodymium, neodymium or samarium and x, y, and (x+y) are less than 1.

In accordance with a further exemplary embodiment of the present invention, a method for controlling the temperature of a spacecraft comprises selecting a first alkaline earth metal M2 and a second alkaline earth metal M3, wherein M3 is not M2. A variable emissivity material $M1_{(1-(x+y))}M2_xM3_yMnO_3$ is formed, wherein M1 is selected from the group consisting of lanthanum, scandium, yttrium, praseodymium, neodymium or samarium, and x, y, and (x+y) are less than 1. The variable emissivity material is applied to a component of a spacecraft.

BRIEF DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

The present invention is directed to various embodiments of a tunable variable emissivity material that can be fabricated to passively reduce the temperature extremes experienced by aerospace systems, such as satellites, high-altitude inflatables, deep-spacecraft, and the like. A material with a high emissivity efficiently radiates heat while a material with a low emissivity radiates less heat. A variable emissivity material is any material that, when heated above a critical temperature $T_c$, experiences a phase change that alters the material's emissivity. At the material transforms from a low emissivity metal into a high emissivity semiconductor. As a result of this behavior, the material tends to self-regulate its temperature near $T_c$, radiating heat at temperatures above $T_c$ and retaining heat below $T_c$. The material can be applied to any surface where temperature control through radiative emission is required (e.g., satellite radiators).

In accordance with an exemplary embodiment of the present invention, a variable emissivity material can be represented by the following:

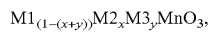

where M1 comprises lanthanum (La), scandium (Sc), yttrium (Y), praseodymium (Pr), neodymium (Nd), or samarium (Sm) and preferably is lanthanum. M2 is an alkali earth metal and M3 is an alkali earth metal that is not M2. In a preferred embodiment of the invention, M2 comprises beryllium (Be) or magnesium (Mg), more preferably Be, and M3 comprises barium (Ba), strontium (Sr), or calcium (Ca), more preferably Ba. The sum (x+y) is less than 1.

Figure 1:
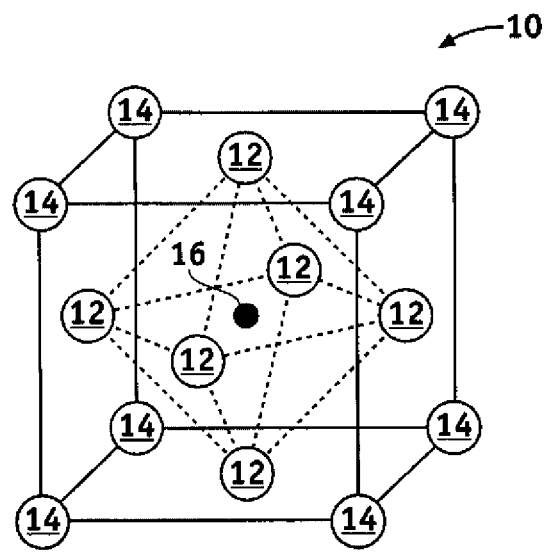
FIG. 1 is a schematic diagram of the atoms of a perovskite structure.

The variable emissivity material has a perovskite oxide structure 10, such as that illustrated in FIG. 1, having oxygen ($O^{-2}$) atoms 12, manganese ($Mn^{+3}$ or $Mn^{+4}$) atoms 14, and rare earth or other +3 transition metal ions M1 16. A certain portion of the rare earth/+3 transition metal ions M1 16 are replaced with one of two different alkali earth metal ions, M2 and M3. The variable emissivity material undergoes a metal-insulator phase transition at a critical temperature $T_c$. Below $T_c$, the material is metallic and ferromagnetic and exhibits a low emissivity, that is, an emissivity $\epsilon$ of no greater than 0.5. At temperatures above $T_c$, the material behaves like a paramagnetic insulator with a high emissivity, that is $\epsilon$ of no less than about 0.6. Therefore, in the regime where thermal emission controls surface or structure temperature, the material tends to self regulate its temperature near $T_c$. Compared to a material with a constant $\epsilon$, the variable emissivity material will radiate heat quickly at temperatures greater than $T_c$, thus cooling a substrate or structure upon which the material is disposed, and radiate heat slowly at temperatures below $T_c$, thus retaining heat. For space applications, it is desirable to maintain components or structures of spacecraft, such as electronic components or human occupants, at about room temperature, that is, about 270K to about 320K. Accordingly, in a preferred embodiment of the invention, the variable emissivity material has a $T_c$ in the range of about 270K to about 320K. In a more preferred embodiment of the invention, the variable emissivity material has a $T_c$ in the range of about 290K to about 310K.

Figure 2:
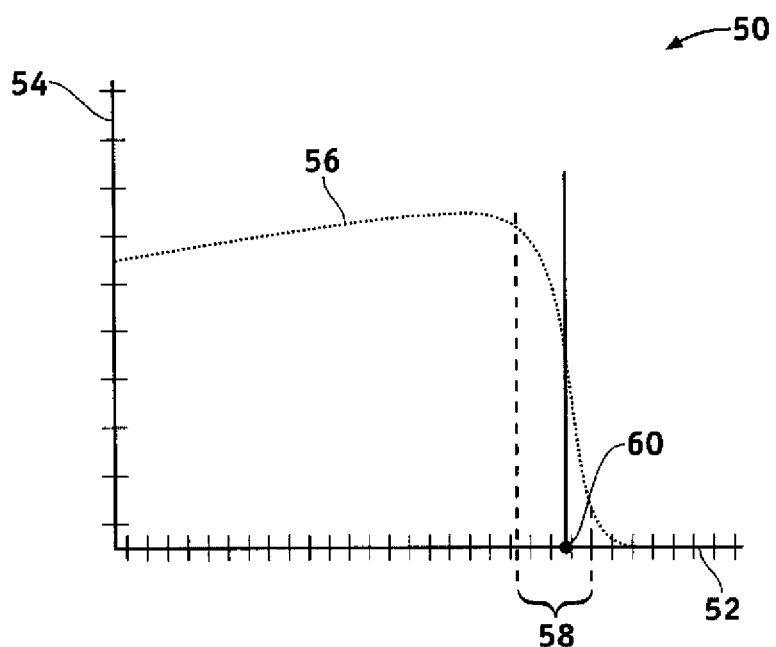
FIG. 2 is a graph of a ferromagnetic-paramagnetic transition of a variable emissivity material in accordance with an exemplary embodiment of the present invention.

The emissivity change at $T_c$ is accompanied by a magnetic (ferromagnetic-paramagnetic) transition. Accordingly, it can be detected with a Superconducting Quantum Interference Device (SQUID). As the variable emissivity material is heated in the presence of a weak magnetic field, a large drop in the magnetic moment of the material will occur as it undergoes the ferromagnetic-paramagnetic transition. FIG. 2 is a graph 50 of this transition for a variable emissivity material of the present invention, with the x-axis 52 representing temperature (in degrees Kelvin) and the y-axis 54 representing the long moment (in electromagnetic units (emu)). The transition from the ferromagnetic to the paramagnetic state is indicated by the transition curve 56. The transition width 58 is the temperature difference that occurs when the slope of the curve 58 has about the highest magnitude. The critical temperature $T_c$ 60 is the approximate temperature that occurs when the transition is at its half-way point. The narrower the transition width, the more the material will bias the substrate temperature towards $T_c$. In a preferred embodiment of the invention, the variable emissivity material has a transition width 58 of no more than about 30K, more preferably no more than about 20K.

Figure 3:
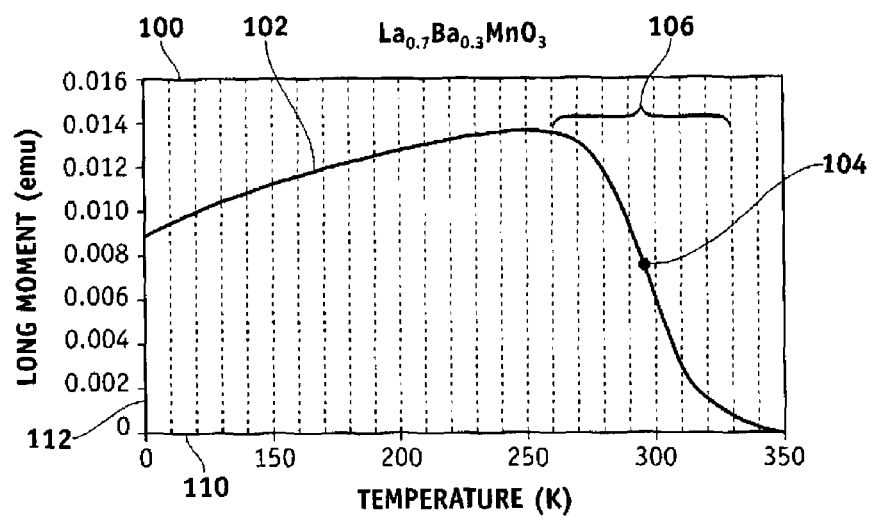
FIG. 3 is a graph of a ferromagnetic-paramagnetic transition of $La_{0.7}Ba_{0.3}MnO_3$.
Figure 4:
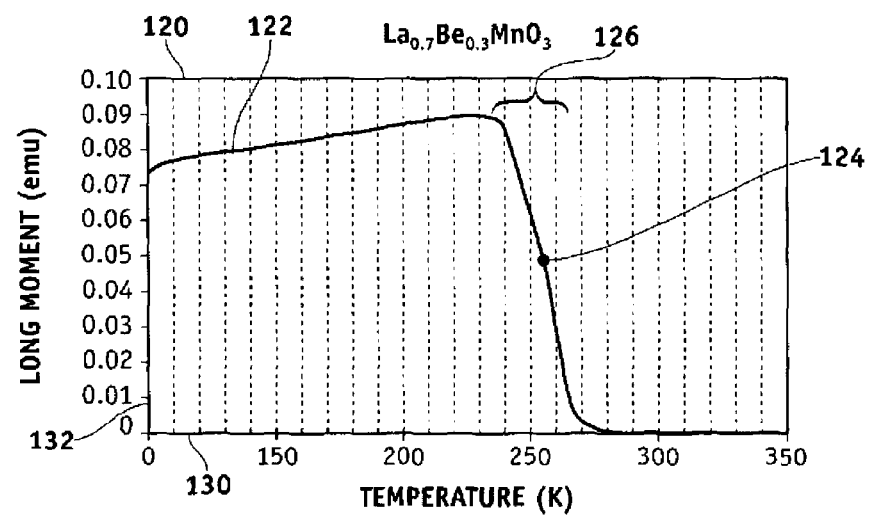
FIG. 4 is a graph of a ferromagnetic-paramagnetic transition of $La_{0.7}Be_{0.3}MnO_3$.

The critical temperature $T_c$ and the transition width of the variable emissivity material can be selected for or "tuned" to predetermined values by varying the identity and quantity of the alkali earth metal ions M2 and M3. For example, FIG. 3 is a graph 100 of the transition curve 102 of $La_{0.7}Ba_{0.3}MnO_3$ and FIG. 4 is a graph 120 of the transition curve 122 of $La_{0.7}Be_{0.3}MnO_3$. The x-axes in both figures, 110 and 130 respectively, represent the temperature of the material (in degrees Kelvin). The y-axes in the figures, 112 and 132 respectively, represent the long moment of the material (in electromagnetic units (emu)). The $T_c$ 104 of $La_{0.7}Ba_{0.3}MnO_3$ is approximately 295K, while the $T_c$ 124 of $La_{0.7}Be_{0.3}MnO_3$ is only about 252K. In contrast, the transition width 126 of $La_{0.7}Be_{0.3}MnO_3$ is much narrower, about 25K, than the transition width 106 of $La_{0.7}Ba_{0.3}MnO_3$, which is about 70K. For a given application, it may be desirable to fabricate a variable emissivity material that has the relatively higher $T_c$ of $La_{0.7}Ba_{0.3}MnO_3$ and the relatively narrow transition width of $La_{0.7}Be_{0.3}MnO_3$. In accordance with an exemplary embodiment of the present invention, a variable emissivity material with a high $T_c$ and a narrow transition width can be achieved with the specific selection of M2 and M3 and their respective mole fractions.

Figure 5:
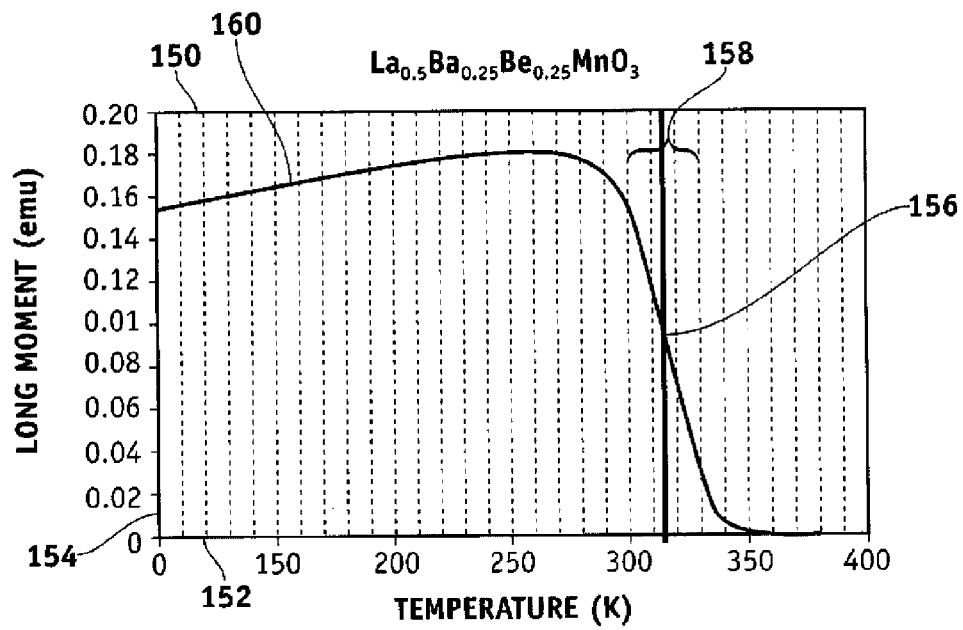
FIG. 5 is a graph of a ferromagnetic-paramagnetic transition of $La_{0.5}Ba_{0.25}Be_{0.25}MnO_3$.
Figure 6:
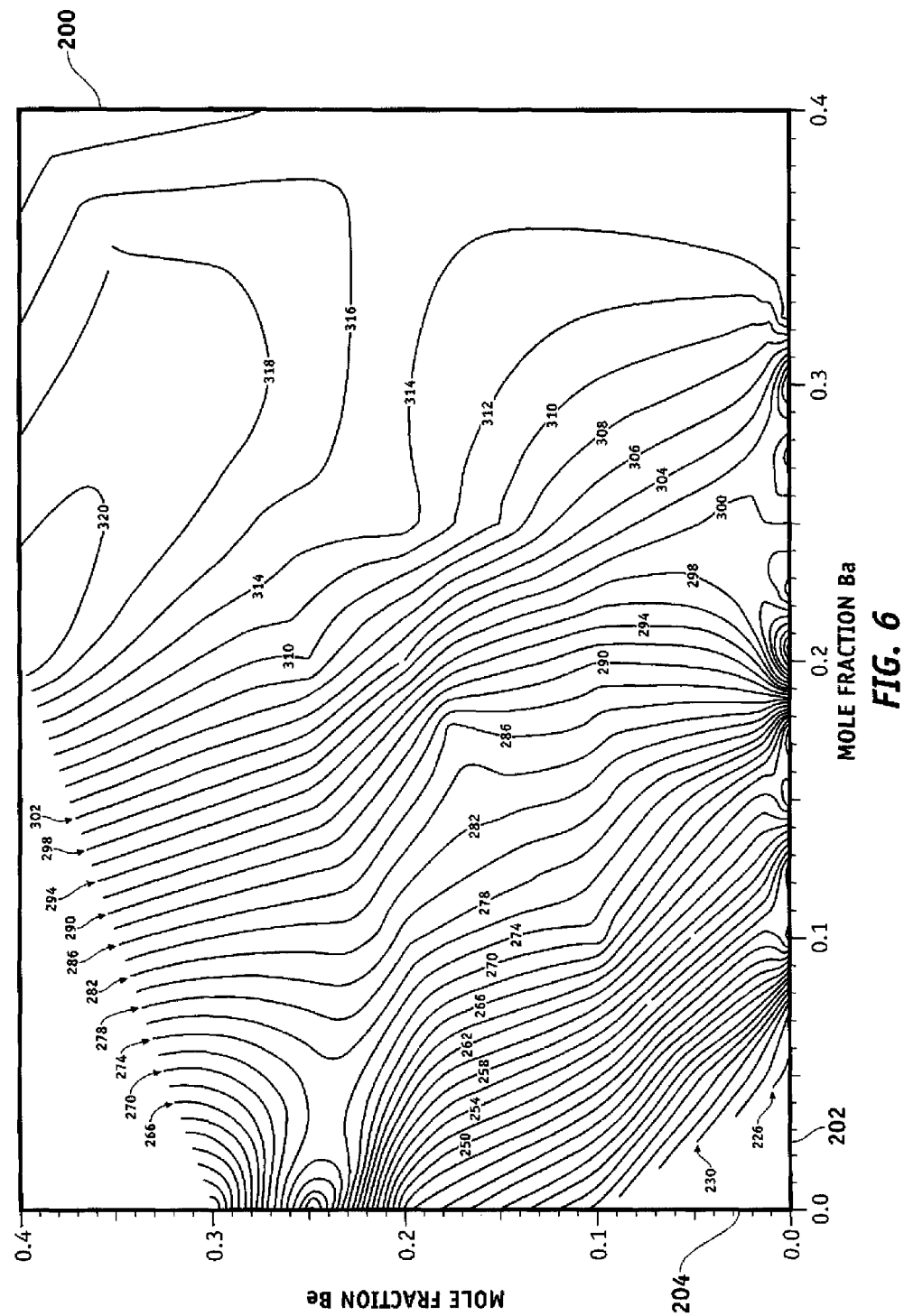
FIG. 6 is a contour map of the critical temperature $T_c$ of $La_{(1-(x+y))}Ba_xBe_yMnO_3$ based on the mole fraction of barium and beryllium.

For example, in accordance with one embodiment of the invention, the variable emissivity material may be $La_{0.5}Ba_{0.25}Be_{0.25}MnO_3$. FIG. 5 is a graph 150 of the transition curve 160 of $La_{0.5}Ba_{0.25}Be_{0.25}MnO_3$. The x-axis 152 represents the temperature of the material in degrees Kelvin and the y-axis 154 represents the long moment of the material in electromagnetic units (emu). As illustrated in FIG. 5, $La_{0.5}Ba_{0.25}Be_{0.25}MnO_3$ has a relatively high $T_c$ 156 of about 315K and yet has a relatively narrow transition width 158 of about 25 to 30K. FIG. 6 is a contour map 200 illustrating that by varying the mole fraction of barium (x-axis 202) and beryllium (y-axis 204) in $La_{0.5}Ba_xBe_yMnO_3$, $T_c$ can be tuned to a desired value.

Figure 7:
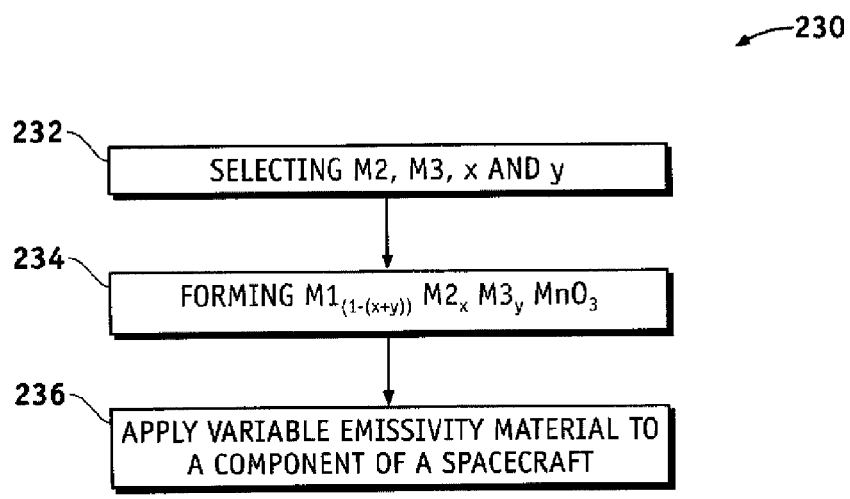
FIG. 7 is a flow chart of a method for fabricating a variable emissivity material, in accordance with an exemplary embodiment of the present invention.

FIG. 7 illustrates a method 230 for using a variable emissivity material $M1_{(1-(x+y))}M2_xM3_yMnO_3$ to control the temperature of a spacecraft. As described above, the variable emissivity material can comprise lanthanum (La), scandium (Sc), yttrium (Y), praseodymium (Pr), neodymium (Nd), or samarium (Sm), and preferably comprises lanthanum. The method comprises the step of selecting the identity of M2 and M3 and the quantity of M2 and M3, that is, x and y (step 232), and, if not already selected, M1. Preferably, the identity and quantity of M2 and M3 are selected so that the resulting variable emissivity material has a predetermined critical temperature $T_c$ and a predetermined transition width. Once M2, M3, x, and y are selected, the variable emissivity material is formed (step 234) and is applied to a component of a spacecraft (step 236).

The variable emissivity material, in accordance with various embodiments of the present invention, may be formed using any suitable method. For example, the variable emissivity material may be synthesized using ion-beam doping of $M1MnO_3$ films with M2 and M3 atoms, oxidation of vapor-deposited stoichiometric metal films of M1, M2, M3 and Mn, or reaction under mechanically energetic conditions such as ball-milling, jar milling, or hand-grinding of reactant metal oxides M1O, M2$_2$O$_3$, M3$_2$O$_3$, and MnO$_3$, followed by post-annealed compositions.

Figure 8:
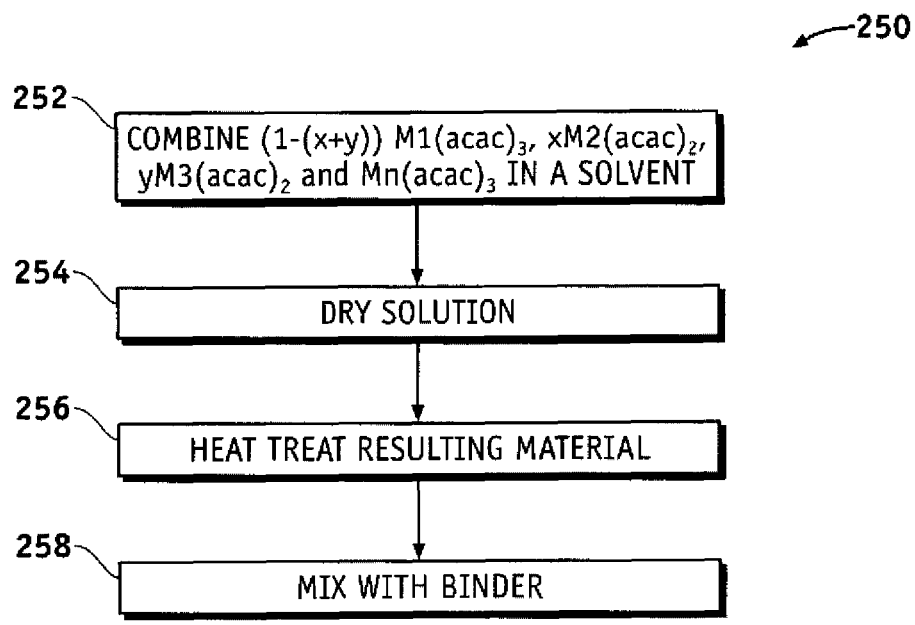
FIG. 8 is a flow chart of a method for fabricating a variable emissivity coating, in accordance with an exemplary embodiment of the present invention.

FIG. 8 illustrates a method 250 for synthesizing a variable emissivity material and a variable emissivity coating comprising a variable emissivity material, in accordance with exemplary embodiments of the present invention. Method 250 comprises the step of combining acetylacetonate (C$_5$H$_7$O$_2$) ("acac") ligand-complexed metal ions in a solvent according to the following equation:

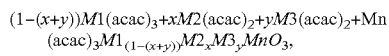

Figure 9:
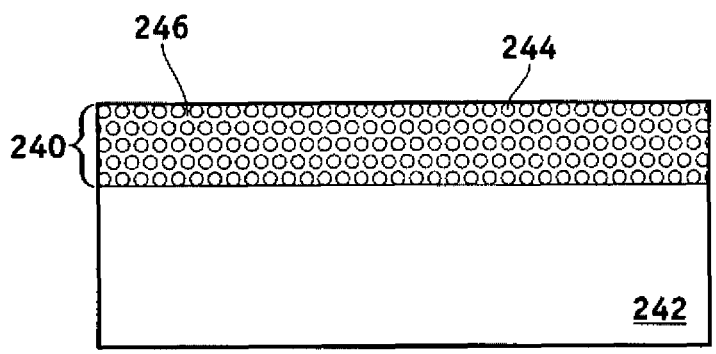
FIG. 9 is a cross-sectional view of a substrate upon which is disposed a variable emissivity coating, in accordance with an exemplary embodiment of the present invention.

(step 252), to form a variable emissivity material. The solvent may be any material capable of dissolving the reactants. To form a film, the variable emissivity material may be deposited onto a binder, such as film of poly(vinyl alcohol) (PVA), and dried (step 254), The variable emissivity film then may be heat-treated to further crystallize the product (step 256). Alternatively, if the variable emissivity material is to be in the form of a powder, the material may be mixed with a PVA aqueous solution and dried (step 254). The mixture then is heat-treated to further crystallize the product (step 256). The heat-treated powder then may be mixed with an organic or inorganic binder so that it can be rolled, painted, sprayed, spin-coated, or the like onto a substrate or so that a substrate can be dipped in the mixture (step 258). As illustrated in FIG. 9, the methods 230 and 250 result in a variable emissivity coating 240 disposed on a substrate 242, where the coating comprises a variable emissivity material 244 that is coupled to the substrate via a binder 246.

The following is an example of the preparation of La$_{0.5}$Ba$_{0.25}$Be$_{0.25}$MnO$_3$ film, in accordance with an exemplary embodiment of the present invention. Lanthanum acetylacetonate (La(acac)$_3$.H$_2$0), manganese acetylacetonate (Mn(acac)$_3$), beryllium acetylacetonate (Be(acac)$_2$) and barium acetylacetonate (Ba(acac)$_2$) may be dissolved in a mixed 4:1 solution of propanoic acid and methanol to form a variable emissivity material. To form a film, a PVA aqueous solution (about 15%) may be spin-coated onto a substrate, and the variable emissivity material may be spin-coated on the PVA film, followed by drying at 150° C. for about 10 hours. The resulting film then may be heat-treated in air at 400 to 600° C., preferably 450 to 550° C. To form a powder, the perovskite product may be combined with a PVA aqueous solution until a viscous gel is formed (about 6 wt % PVA) and dried at about 150° C. for about 4 to about 10 hours. The resulting product then may be heat-treated in air at 1000° C. for about 5 hours. The heat-treated powder may be mixed with an inorganic or organic binder so that it can be rolled, painted, sprayed, spin-coated, or the like onto a substrate or so that a substrate can be dipped in the mixture. Suitable binders include potassium silicate, such as Kasil® available from PQ Corporation of Philadelphia, Pa., silicone-modified epoxy, polyurethane, poly(dimethylsiloxane), poly(dimethylsiloxane-co-methylphenylsiloxane), polyamide, Dow Corning® HC 2000, available from Dow Corning Corporation of Midland, Mich., or a combination thereof. For example, 300 g of the heat-treated powder may be mixed with 175 g of Kasil® and 100 g of H$_2$O to form an inorganic-based paint.

Accordingly, a variable emissivity material, a method for fabricating a variable emissivity material, and a method for controlling the temperature of a spacecraft using a variable emissivity material have been presented. The variable emissivity material radiates heat quickly at temperatures above the material's critical temperature T$_c$ and slowly at temperatures below T$_c$. The T$_c$ and the transition width of the variable emissivity material can be tuned to desired values by the strategic selection of the identity and quantity of the components of the variable emissivity material. While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A method for controlling the temperature of a spacecraft, the method comprising:
   selecting a first alkaline earth metal M2;
   forming a variable emissivity material M1$_{(1-(x+y))}$M2$_x$M3$_y$MnO$_3$, wherein:
   M1 is selected from the group consisting of lanthanum, scandium, yttrium, praseodymium, neodymium or samarium;
   x, y and (x+y) are greater than zero and less than 1; and
   M3 is beryllium and M2 is not M3; and
   applying the variable emissivity material to a component of a spacecraft.

2. The method of claim 1, wherein selecting M2 comprises selecting M2 so that the variable emissivity material has a critical temperature (Tc) in the range of about 270 to about 320K and a transition width of no more than about 30K.

3. The method of claim 1, wherein the forming comprises ion-beam doping of M1MnO$_3$ films with M2 and M3 atoms.

4. The method of claim 1, wherein the forming and the applying are performed substantially simultaneously and wherein the forming comprises oxidizing vapor-deposited stoichiometric metal films of M1, M2, M3 and Mn.

5. The method of claim 1, wherein the forming comprises ball-milling, jar milling, or hand-grinding reactant metal oxides M1O, M2$_2$O$_3$, M3$_2$O$_3$, and MnO$_3$.

6. The method of claim 1, wherein the forming comprises dissolving (1−(x+y))M1(acac)$_3$, xM2(acac)$_2$, yM3(acac)$_2$ and Mn(acac)$_3$ in a solvent to form the variable emissivity material M1$_{(1-(x+y))}$M2$_x$M3$_y$MnO$_3$, wherein (acac) is acetylacetonate.

7. The method of claim 6, further comprising:
   drying the variable emissivity material; and
   heat-treating the variable emissivity material.

8. The method of claim 1, wherein the selecting comprises selecting M2 from the group consisting of barium, strontium, and calcium.

9. The method of claim 1, wherein the applying the variable emissivity material to a component of the spacecraft comprises mixing the variable emissivity material with a binder comprising one selected from the group consisting of potassium silicate, silicone-modified epoxy, polyurethane, poly (dimethylsiloxane), poly(dimethylsiloxane-co-methylphenylsiloxane), polyamide, and a combination thereof.

10. The method of claim 9, wherein applying the variable emissivity material to a component of the spacecraft comprises rolling, painting, spraying, or spin-coating the variable emissivity material/binder mixture onto the component.

11. A method for controlling the temperature of a spacecraft, the method comprising:

dissolving 0.5La(acac)$_3$, 0.25Ba(acac)$_2$, 0.25Be(acac)$_2$ and Mn(acac)$_3$ in a solvent to form a variable emissivity material La$_{0.5}$Ba$_{0.25}$Be$_{0.25}$MnO$_3$, wherein (acac) is acetylacetonates and applying the variable emissivity material to a component of a spacecraft.

\* \* \* \* \*